(12) United States Patent
McLellan

(10) Patent No.: US 11,347,706 B2
(45) Date of Patent: May 31, 2022

(54) ROTOR MOVEMENT CONTROL AND ROTOR WIRING FOR ROTOR-BASED ENCRYPTION MACHINES AND ELECTRONIC EQUIVALENTS

(71) Applicant: Scott W. McLellan, Kempton, PA (US)

(72) Inventor: Scott W. McLellan, Kempton, PA (US)

( * ) Notice: Subject to any disclaimer, the term of this patent is extended or adjusted under 35 U.S.C. 154(b) by 870 days.

(21) Appl. No.: 14/986,052

(22) Filed: Dec. 31, 2015

(65) Prior Publication Data

US 2017/0193025 A1    Jul. 6, 2017

(51) Int. Cl.
| | |
|---|---|
| *G06F 16/22* | (2019.01) |
| *H04L 9/10* | (2006.01) |
| *G09C 1/00* | (2006.01) |
| *H04L 9/38* | (2006.01) |
| *H04L 9/06* | (2006.01) |

(52) U.S. Cl.
CPC .......... *G06F 16/2272* (2019.01); *G09C 1/00* (2013.01); *H04L 9/06* (2013.01); *H04L 9/10* (2013.01); *H04L 9/38* (2013.01)

(58) Field of Classification Search
CPC . G06F 17/30336; G06F 16/2272; H04L 9/10; H04L 9/06; H04L 9/38; G09C 1/00
USPC .......................................................... 707/741
See application file for complete search history.

(56) References Cited

U.S. PATENT DOCUMENTS

| | | | |
|---|---|---|---|
| 1,657,411 A | 1/1928 | Arthur | |
| 1,683,072 A | 9/1928 | Hebern | |
| 6,097,812 A | 8/2000 | Friedman | |
| 6,130,946 A | 10/2000 | Friedman | |
| 10,157,108 B2 * | 12/2018 | Guerin | ................ H04L 67/1097 |
| 2004/0233150 A1 * | 11/2004 | Guttag | ..................... G09G 5/10 345/87 |
| 2008/0270441 A1 * | 10/2008 | Eke | ......................... G06F 1/035 |
| 2009/0234841 A1 * | 9/2009 | Watanabe | ........... G06F 16/9017 |
| 2011/0066853 A1 * | 3/2011 | Engels | .................. H04L 9/0838 713/168 |
| 2012/0087488 A1 * | 4/2012 | Engels | ...................... G06F 7/00 380/28 |
| 2012/0117076 A1 * | 5/2012 | Austermann | ....... G06F 16/3338 707/741 |
| 2012/0232780 A1 * | 9/2012 | Delson | .................. A63F 13/803 701/400 |
| 2013/0028410 A1 * | 1/2013 | Parrish | ..................... G09C 1/00 380/28 |

(Continued)

*Primary Examiner* — Hosain T Alam
*Assistant Examiner* — Saba Ahmed

(57) ABSTRACT

A cryptographic system having a plurality of rotors or electronic equivalents using displacement tables. A rotor movement controller, in accordance with a rotor selection value, selectively moves one or more of the rotors or the electronic equivalent of the rotors for each data input value. Contiguous rotor selection values have a triangle or sawtooth shape. A key-driven displacement look-up table randomizes the selection values. The rotor wirings or displacement tables each have N displacement values. The N displacement values are one to N−1 inclusive once and N/2 twice and arranged in a sequence that forms a single loop. Additionally, the N displacement values may be arranged in a sequence that is self-reciprocal so that no change in the rotors or displacement tables is needed whether encrypting or decrypting except for selectively adding a factor of N/2 when indexing the displacement tables or setting the initial position of the rotors.

17 Claims, 7 Drawing Sheets

(56) References Cited

U.S. PATENT DOCUMENTS

2015/0268133 A1* 9/2015 Ranjan ................ G06F 11/2205
                                                    702/183
2016/0003035 A1* 1/2016 Logan ....................... E21B 7/04
                                                    340/854.6

* cited by examiner

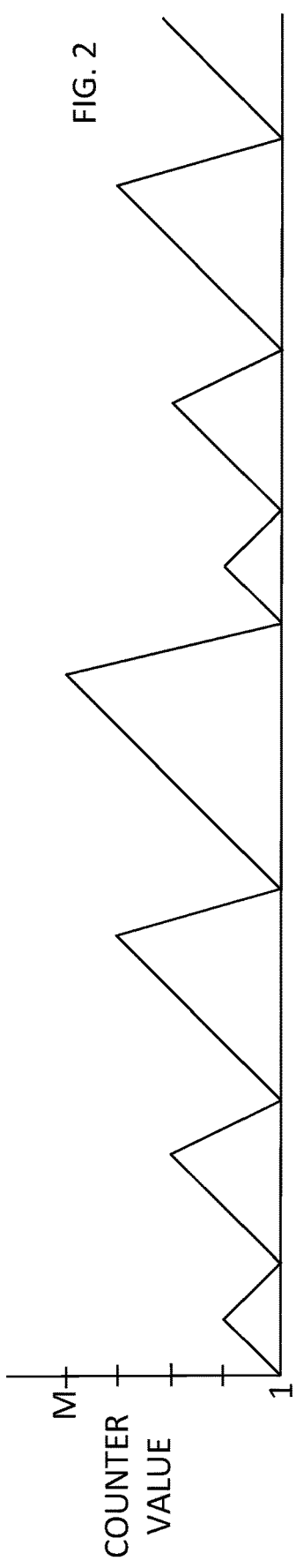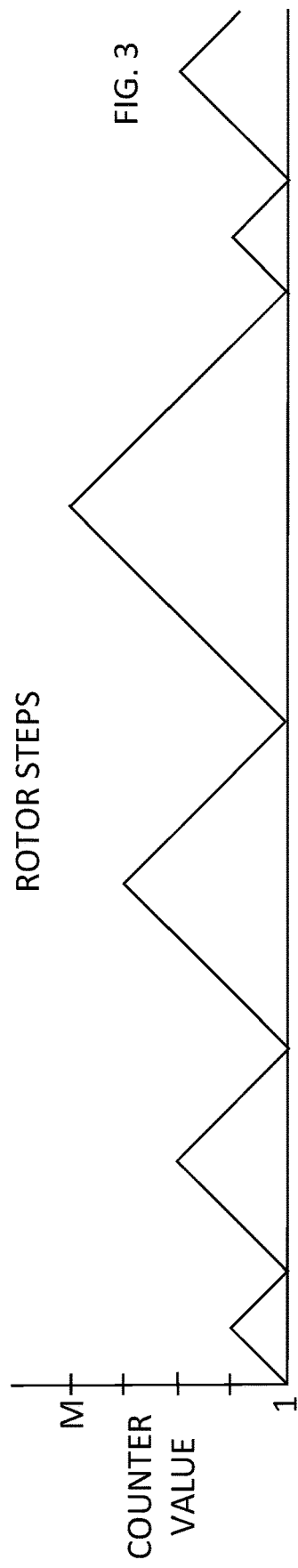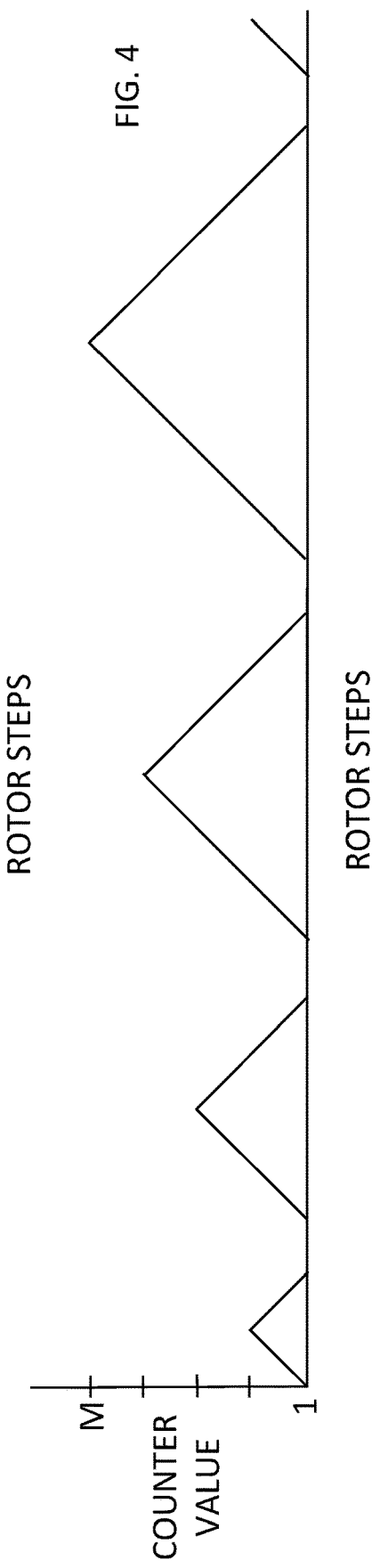

ROTOR MOVEMENT CONTROL AND ROTOR WIRING FOR ROTOR-BASED ENCRYPTION MACHINES AND ELECTRONIC EQUIVALENTS

BACKGROUND OF THE INVENTION

The present invention relates generally to encryption techniques and, more particularly but not necessarily exclusively, to rotor-based encryption machines and electronic implementations thereof.

Rotor-based polyalphabetic encryption/decryption machines are well known. See, for example, U.S. Pat. No. 1,657,411, issued to A. Schierbius and U.S. Pat. No. 1,683,072 issued to E. H. Hebern, each of which are incorporated by reference herein in their entirety. The electromechanical cryptographic systems described therein have mechanical or physical rotors arranged in tandem to increase the complexity of the encryption/decryption process. However, movement of the rotors are "regular", i.e., one rotor (a "fast" rotor) is sequential stepped with each letter being encrypted until a turn-over point is reached, at which time the stepped rotor and an adjacent rotor are stepped concurrently. While this kind of rotor movement maximizes the number of possible combinations of the rotor positions (e.g., with three rotors and 26 positions per rotor, a maximum of $26^3$ substitution alphabets are possible using the above-described systematic rotor movements), it is also a weakness that helps cryptanalysis. Further, increasing the number of rotors, for example from three to five or seven, does not add significantly to the security of the cryptographic system since some of the rotors might not move at all when encrypting a message of a typical lengths, e.g., 500 characters or less, because the non-moving rotors together merely form a fixed permutation in addition to the changing alphabetic substitutions performed by the moving rotors.

To make the cryptographic system more secure, it is generally desirable that the rotors move in an irregular fashion. Two techniques to achieve irregular rotor movements are shown in U.S. Pat. Nos. 6,130,946 and 6,097,812, issued to W. F. Friedman, each of which are incorporated by reference herein in their entirety. The latter patent allows for virtually unlimited rotor movement sequences but requires a separate external source of data in the form of a punched paper tape that determines which one or ones of the wheels are advanced each time the paper tape advances. While this results in a highly secure cryptographic system, it might be inconvenient to provide a separate source of keying (rotor movement) material in addition to the keys needed to initialize the cryptographic system, e.g., which rotors are to be used, the order of the rotors in the machine, and initial positions of the rotors. It is thus desirable to provide an irregular but deterministic rotor movement that can be implemented without the need for an external source of rotor movement information. Such designs might be useful in non-mechanical (electronic) implementations of a rotor-based encryption system.

In addition to the movement of the rotors, the wiring configuration of each of the rotors needs to be considered when designing a rotor-based cryptographic system. Without effective "diffusion" or randomness provided by each of the rotors, the overall security of the cryptographic system might be compromised regardless of how irregular the rotor movements are. Typical known rotor wirings appear to haphazard attempts at providing randomness. Thus, it is desirable to provide a methodical approach to designing rotor wirings. Such an approach might also have uses in non-rotor cryptographic applications, such as in designing S-boxes.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not been drawn to scale.

FIGS. 2, 3, and 4 are graphs of exemplary rotor selection values generated by the rotor movement controller shown in FIG. 1 in accordance with various embodiments of the invention;

DETAILED DESCRIPTION OF THE INVENTION

Figure 1:
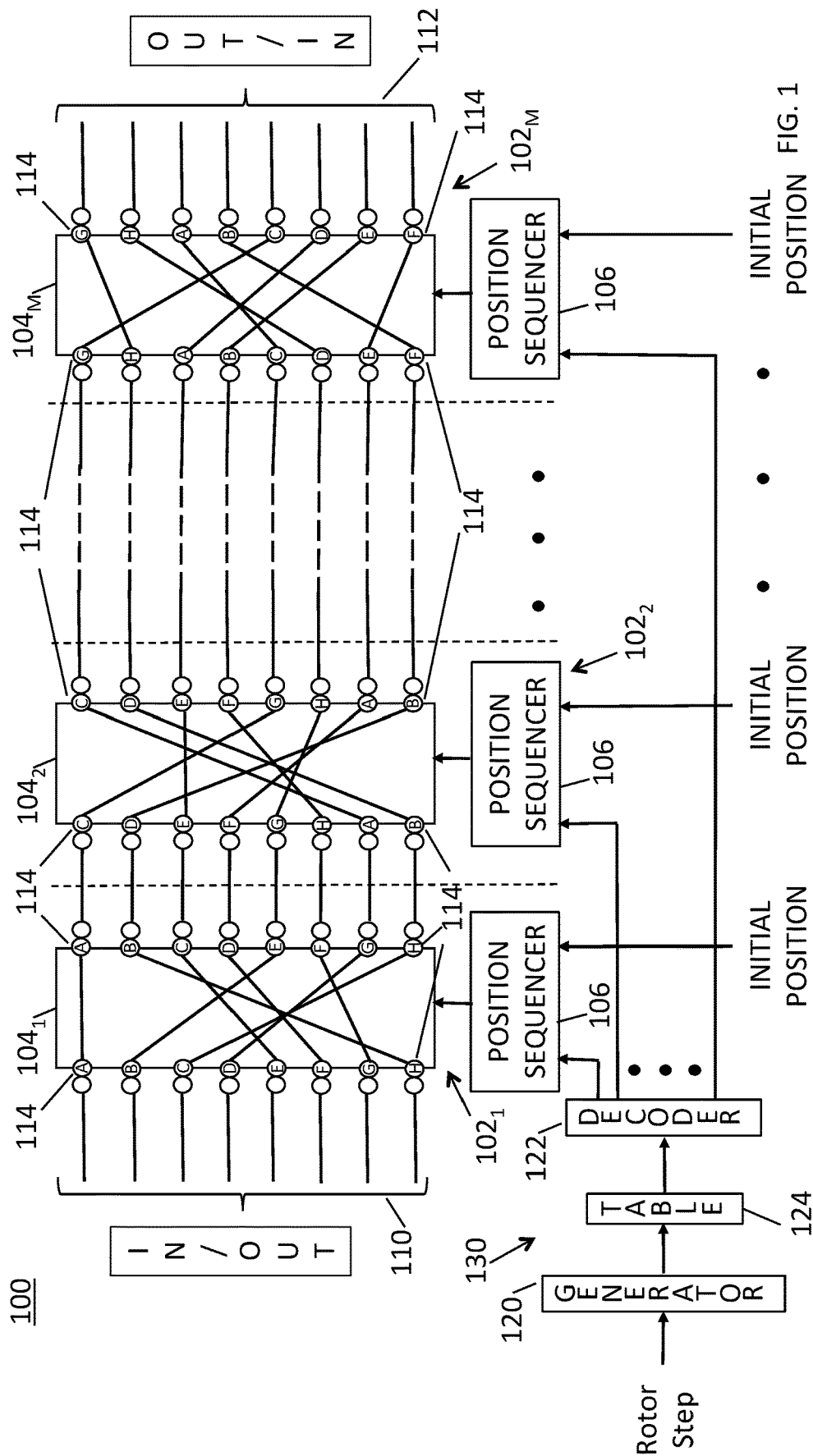
FIG. 1 is an exemplary combined electronic and electromechanical cryptographic system with a rotor movement controller in accordance with various embodiments of the invention.

Detailed illustrative embodiments of the present invention are disclosed herein. However, specific structural and functional details disclosed herein are merely representative for purposes of describing example embodiments of the present invention. The present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a", "an", and "the", are intended to include the plural forms as well, unless the context clearly indicates otherwise. It further will be understood that the terms "comprises", "comprising", "has", "having", "includes", or "including" specify the presence of stated features, steps, or components, but do not preclude the presence or addition of one or more other features, steps, or components. It also should be noted that, in some alternative implementations, the functions/acts noted might occur out of the order noted in the figures. For example, two steps in a sequence shown in succession may in fact be executed substantially concurrently or may sometimes be executed in the reverse order, depending upon the functionality/acts involved. The term "or" is to be interpreted as inclusive unless indicated otherwise. Further, elements in a figure having subscripted reference numbers (e.g., $100_1$, $100_2$, ..., $100_K$) might be collectively referred to herein using the reference number without a subscript, e.g., 100.

In one embodiment of the invention, a method comprises the steps of receiving a data value having one of N values where N is an integer, generating a selection value based on a previous selection value, selectively changing a position value in response to the selection value, calculating an index value using the received data value combined with the selectively changed position value, looking up a displacement value using a look-up table indexed by the index value, and combining the received data value with the displacement value to generate a transformed data value. The look-up table has N entries of values from one to N−1 inclusive once and N/2 twice.

In another embodiment of the invention, a method comprises the steps of receiving a data value having one of N values where N is an integer, generating a selection value based on a previous selection value, selectively changing a position value in response to the selection value, calculating an index value using the received data value combined with the selectively changed position value and a configuration value, looking up a displacement value using a look-up table indexed by the index value, and combining the received data value with the displacement value to generate a transformed data value. The configuration value has a value of either zero or N/2. The look-up table has N entries of values from one to N−1 inclusive once and N/2 twice and in a sequence that forms a single loop that is self-reciprocal.

In another embodiment of the invention, a method comprises the steps of receiving a data value, generating a selection value based on a previous selection value, selectively changing a position value in response to the selection value, calculating an index value using the received data value combined with the selectively changed position value, looking up a displacement value using an look-up table indexed by the index value, and combining the received data value with the displacement value to generate a transformed data value. The selection value is generated from a previous position value by i) increasing the selection value with each received data value until the selection value equals or exceeds a threshold value, then ii) decreasing the selection value with each received data value until the selection value equals a minimum value, then iii) increasing the threshold value, and then iv) repeating steps i)-iii) until the threshold value equals or exceeds a maximum value; and then v) decreasing the threshold value; and repeating steps i)-v).

FIG. 1 illustrates a first exemplary cryptographic system 100 using mechanical (physical) rotors 104, the movements of which are controlled using a combined electronic and electromechanical technique in accordance with one embodiment of the invention.

While some electromechanical embodiments of the invention are described herein, they are illustrative since physical implementations can be easier to understand. In most circumstances, the system 100 is implemented in all electronic form, i.e., in software or firmware, since electronic versions generally operate faster and have more flexibility, i.e., implementations can be changed quickly without physical intervention. Such all-electronic embodiments will be discussed herein in connection with FIGS. 7 and 8.

The system 100 comprises multiple stages $102_1$-$102_M$, each stage 102 having a rotor 104 and a rotor position sequencer 106. Each of the rotor position sequencers 106 controls rotational movement of its respective rotor 104. In one embodiment, a rotor position sequencer 106 includes a motor or solenoid that steps its respective rotor 104 by one position. In other embodiments, each rotor position sequencer 106 moves its respective rotor by an amount that does not have a common factor of the number of possible positions of the rotor, e.g., moving a 26 (2×13) position rotor by three positions, but not four positions, each time the sequencer is clocked.

Each of the rotor position sequencers 106 has an initial position input that sets the corresponding rotor 104 to a known starting position before the rotor is stepped. The starting positions of the rotors form part of a key used to encrypt/decrypt data presented to ports 110, 112. In this example, each rotor 104 has eight terminals 114 on each side labeled A-H and, thus, has eight possible rotational positions. Using the top rotor terminals 114 of each rotor 104 as the rotational position of that rotor and moving from left to right, the three rotors $104_1$, $104_2$, and $104_M$ are shown in rotational positions A, C, and G, respectively. Using the illustrated rotational positions as the initial positions of the rotors 104, then A, C, and G form part of the encryption/decryption key, the key being used for both encryption and decryption since the system 100 is symmetrical.

Input/output ports 110, 112 receive unencrypted data ("plaintext") or encrypted data ("ciphertext") and output encrypted or unencrypted data, respectively. In one embodiment, data to be encrypted is applied to port 110 and the encrypted data is delivered to port 112. Similarly and in the same embodiment, data to be decrypted is applied to port 112 and the unencrypted data is delivered to port 110. This is possible because the rotors 104 have physical wires enabling signals to pass bidirectionally between the ports 110, 112, allowing encrypting and decrypting by the system 100 without physically changing the rotors 104. As will be explained in more detail below, each of the rotors 104 is designed to have as many pairs of terminals or contacts 114 and rotational positions (N) as there are elements in the alphabet to be encrypted, e.g., N=26 for the Latin alphabet A-Z. Thus, each port 110, 112 has N leads. Typically, only one lead of the port 110 is energized at a given time since there is only one lead for each letter of the alphabet. Also as will be explained in more detail below, each of the rotors 104 are wired to maintain a one-for-one correspondence between the leads of port 110 and the leads of port 112 regardless of the rotational positions of the rotors 104. Thus, only one lead of port 112 is energized at a time when any one of the leads of the port 110 is energized. Which one of the leads of the port 112 is energized is determined by the positions and wirings of the rotors 104. However, it is possible to energize more than one or all of the N input leads of port 110 at a time, resulting in an equal number of energized leads at the output port 112.

Each time a letter is to be encrypted or decrypted, the corresponding lead in the respective port 110, 112 is energized. Either before (preferred) or after the lead is energized, one or more of the rotor position sequencers 106 is clocked to step the rotational position of its corresponding rotor 104.

Complexity of the system 100 is one determinant in the level of security provided by the system 100. Generally, the more complex the encryption, the more difficult it is for an eavesdropper without the correct key to correctly decode an intercepted ciphertext sent, for example, via an unsecure channel such as radio or email. But merely adding stages 102 to the system 100 will not significantly increase the level of difficulty if the only a few of the rotors 104 are stepped during operation of the system 100. This can be especially problematic for short messages where the length of the message is so short (even with padding) that a subset of the rotors move during encryption of the message. For example, assume that there are three sequential stages $102_1$-$102_3$, the rotors 104 in each stage 102 each have 26 pairs of contacts 114, and that the rotor $104_1$ in the stage $102_1$ is stepped until the rotor reaches its initial position and then the adjacent rotor $104_2$ in stage $102_2$ is stepped, etc., for all the stages 102. A message as long as 675 letters (26×26−1) can be encrypted without causing a third rotor to be stepped.

Thus, it is desirable to assure movement of substantially all of the rotors 104 even when encrypting a relatively short message.

In one embodiment of the invention, a rotor movement controller 130, comprising a rotor selection generator 120 coupled to a decoder 122, controls the clocking of the sequencers 106. The decoder 122 is a one-of-M decoder that, in response to a rotor selection value generated by the generator 120, clocks one of M rotor position sequencers 106 each time a letter or data value is processed by the system 100. In another embodiment, the controller 130 clocks one or more of the rotor position sequencers 106 for each letter or data value processed.

If the rotor selection generator 120 merely sequences from one to M repeatedly and the decoder 122 clocks one of the sequencers 106 in accordance with the rotor selection values (e.g., if the value is one, then the sequencer 106 in stage $102_1$ is clocked, if the value is 2, then the sequencer 106 in stage $102_2$ is clocked, etc.), then the rotors 104 will return to their initial positions after M×N letters or data values have been processed (encrypted) by system 100. Assuming N=26 and there are five rotors 104 (M=5), then only 130 letters will be uniquely encoded (i.e., 130 alphabetic substitutions will be generated) before rotors 104 return to their initial positions and the same sequence of substitution alphabets will repeat, a serious weakness in the cryptographic system 100.

In accordance with one embodiment of the invention, the sequencer 120 generates a rotor selection value in accordance with one or more sequences similar to the graphs shown in FIG. 2, 3, or 4. The sequence graphed in FIG. 2 has a sawtooth appearance whereas the sequences graphed in FIGS. 3 and 4 are triangular. In either case, the sequences range from one to M. For example and assuming M=5, a portion the sequence shown in FIG. 2 is:

1, 2, 1, 2, 3, 1, 2, 3, 4, 1, 2, 3, 4, 5, 1, 2, 1, 2, 3, . . .

In FIG. 3, also with M=5, a portion of the sequence is:

1, 2, 1, 2, 3, 2, 1, 2, 3, 4, 3, 2, 1, 2, 3, 4, 5, 4, 3, 2, 1, 2, 1, 2, 3, . . . .

A variation of this sequence is:

1, 2, 1, 2, 3, 2, 1, 2, 3, 4, 3, 2, 1, 2, 3, 4, 5, 4, 3, 2, 1, 1, 2, 1, 2, 3, . . . , where an extra "1" (bolded) is added to each sequence before repeating.

In FIG. 4 with M=5, a portion of the sequence is:

1, 2, 1, 2, 3, 2, 1, 2, 3, 4, 3, 2, 1, 2, 3, 4, 5, 4, 3, 2, 1, 2, 3, 4, 3, 2, 1, 2, 3, 2, 1, 2, 1, 2, 3, . . . .

A variation of this sequence is:

1, 2, 1, 2, 3, 2, 1, 2, 3, 4, 3, 2, 1, 2, 3, 4, 5, 4, 3, 2, 1, 2, 3, 4, 3, 2, 1, 2, 3, 2, 1, 2, 1, 1, 2, 1, 2, 3 . . . , where an extra "1" (bolded) is added to each sequence before repeating.

Figure 5:
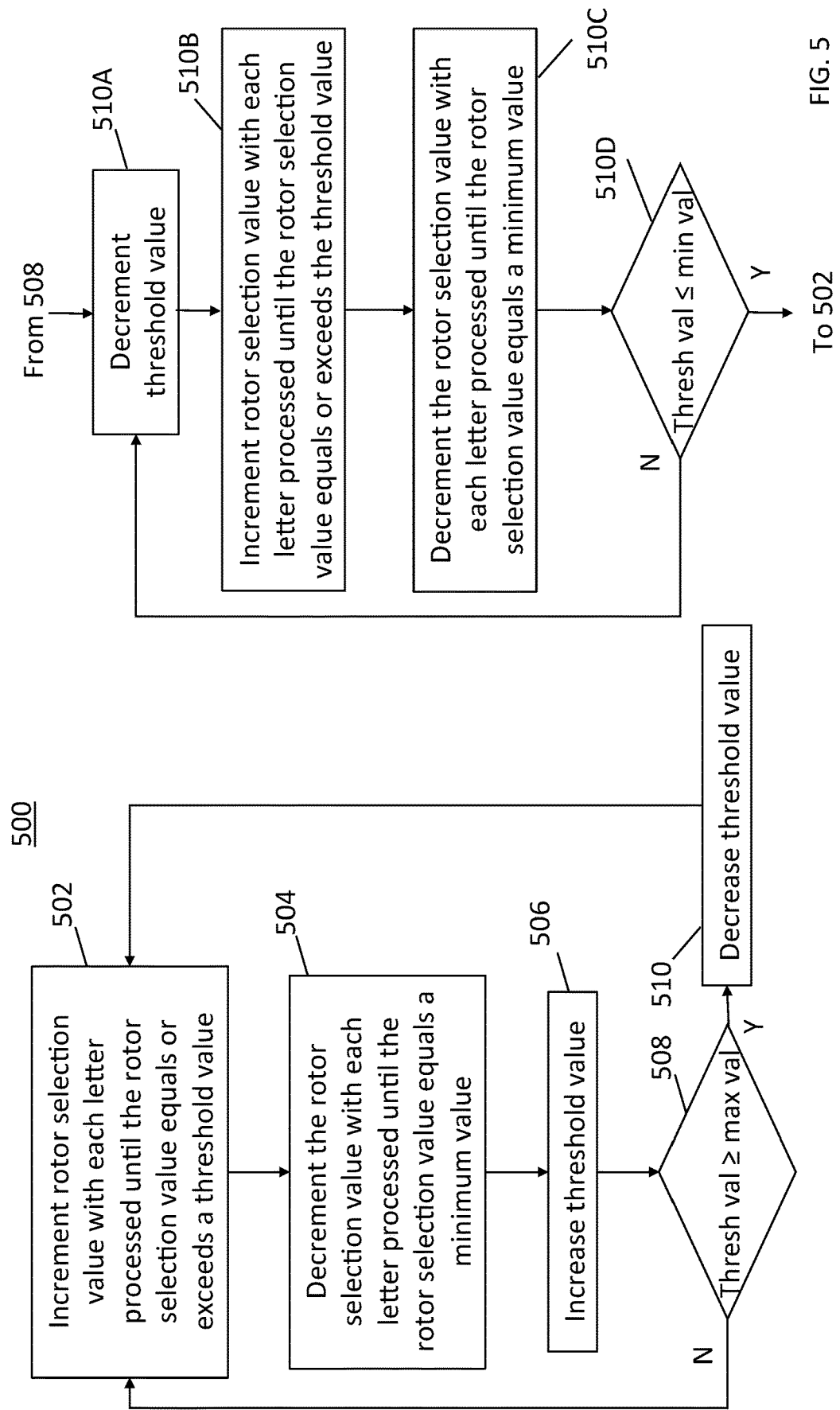
FIG. 5 is an exemplary flowchart illustrating a process for generating the sequences shown in FIGS. 2-4 in accordance with various embodiments of the invention.

Generally, the above sequences might be generated by the process 500 shown in FIG. 5. Starting with step 502, a rotor selection value is incremented with each letter or data value processed by system 100 until the rotor selection value equals or exceeds a threshold value. Then, in step 504, the rotor selection value is decreased, such as by decrementing by one, with each letter or data value processed by system 100 until the rotor selection value equals a minimum value, e.g., one. Then, in step 506, the threshold value is increased, such as by incrementing by one, and steps 502-506 are repeated until the threshold value equals or exceeds a maximum value as determined in step 508. Then the threshold value is decreased in step 510 and steps 502-510 are repeated.

Two alternative embodiments of step 510 are provided for decreasing the threshold value. In one embodiment (not shown) the threshold value is simply reset to the minimum value of the threshold value, e.g., one, each time step 510 is executed. This results generally in the sequence graphed in FIG. 2. In an alternative embodiment, step 510 comprises four steps, 510A, 510B, 510C, and 510D. In step 510A, the threshold value is decremented. Then in step 510B, the rotor selection value is incremented for each letter processed until the rotor selection value equals or exceeds the threshold value as in step 502. Next in step 510C, the rotor selection value is decreased, such as by decrementing by one, with each letter processed until the rotor selection value equals the minimum value as in step 504. As determined in step 510D, the steps 510A through 510C are repeated until the threshold value reaches or falls below the minimum value. Once this condition is satisfied, control passes back to step 502. The execution of additional steps 510A through 510D results generally the sequence graphed in FIG. 3.

To achieve the sequence graphed in FIG. 4, the above-described steps include a step (not shown for simplicity) that holds the rotor selection value to the minimum value for one extra processed data value. A programmer with ordinary skill will be able to modify the process 500 shown in FIG. 5 to add the above step. In still another embodiment, instead of holding the rotor selection value to the minimum value for an extra processed data value, the rotor selection value is held at another possible value, e.g., the maximum value, for one extra processed data value.

Assuming that there are five rotors (M=5) and N=26 and for the sequence graphed in FIG. 2, the rotational positions of the rotors 104 will not repeat for 364 letters, while for the sequence graphed in FIG. 3, the positions will not repeat for 520 letters (546 letters in the variant) and for FIG. 4 is 780 letters (806 letters in the variant). While the number of letters is smaller than a total possible number of rotor rotational position combinations ($26^5$ in this example), all of the rotors 104 will be stepped even with a short message having approximately 30 or more letters but still be long enough for 300-500 letter messages. By adding more rotors, however, the number of letters processed before the rotor positions repeat can be extended considerably. For example, by using ten (M=10) rotors, messages with thousands of letters can be processed using the variant of the sequence shown in FIG. 4.

In an alternative embodiment, a mapping table 124 is added to the rotor movement controller 130 in FIG. 1 to change the order that the decoder 122 clocks the rotors 104 in response to the sequencer 120. The table 124 might be selected from a plurality of tables, the selection based or derived from a portion of the key. For example, 16 ($2^4$) tables might be stored in a memory and four bits of the key are used to select which one of the stored tables to use as table 124. In this embodiment, the table 122 performs a one-for-one mapping of the values generated by the sequencer 120 to new values that are applied to the decoder 122.

It might be desirable for the possible tables 122 to be significantly different from each other. One way to assure this is to have a low peak mutual coincidence index for all the tables with respect to each other. For example, for input values in order one to five (as generated by the generator 120), the mapping values for one table might be: 2, 4, 3, 1, and 5. An exemplary mapping table with a low maximum or peak mutual coincidence index with respect to the above table has mapping values of 4, 2, 5, 1, and 3, which has a peak mutual coincidence index of 1, whereas a table having mapping values of 3, 2, 4, 5, 1 has a peak mutual coincidence index of 3 and table having mapping values of 1, 2, 3, 4, 5 (this table makes no change in the values from the generator 120 to decoder 122) has a peak mutual coincidence index of two with respect to the first table. As will be explained below in more detail, a mutual coincidence index between two tables (as well as the wirings of the rotors 104, described in more detail below) is calculated by counting the number of matches between entries of two of the tables each time one table is sequentially shifted with respect to the other table, resulting in Q calculated coincidence indexes, where Q is the number of entries in each of the tables. From these, the maximum or peak mutual coincidence index of the Q calculated mutual coincidence indexes is determined.

Figure 6:
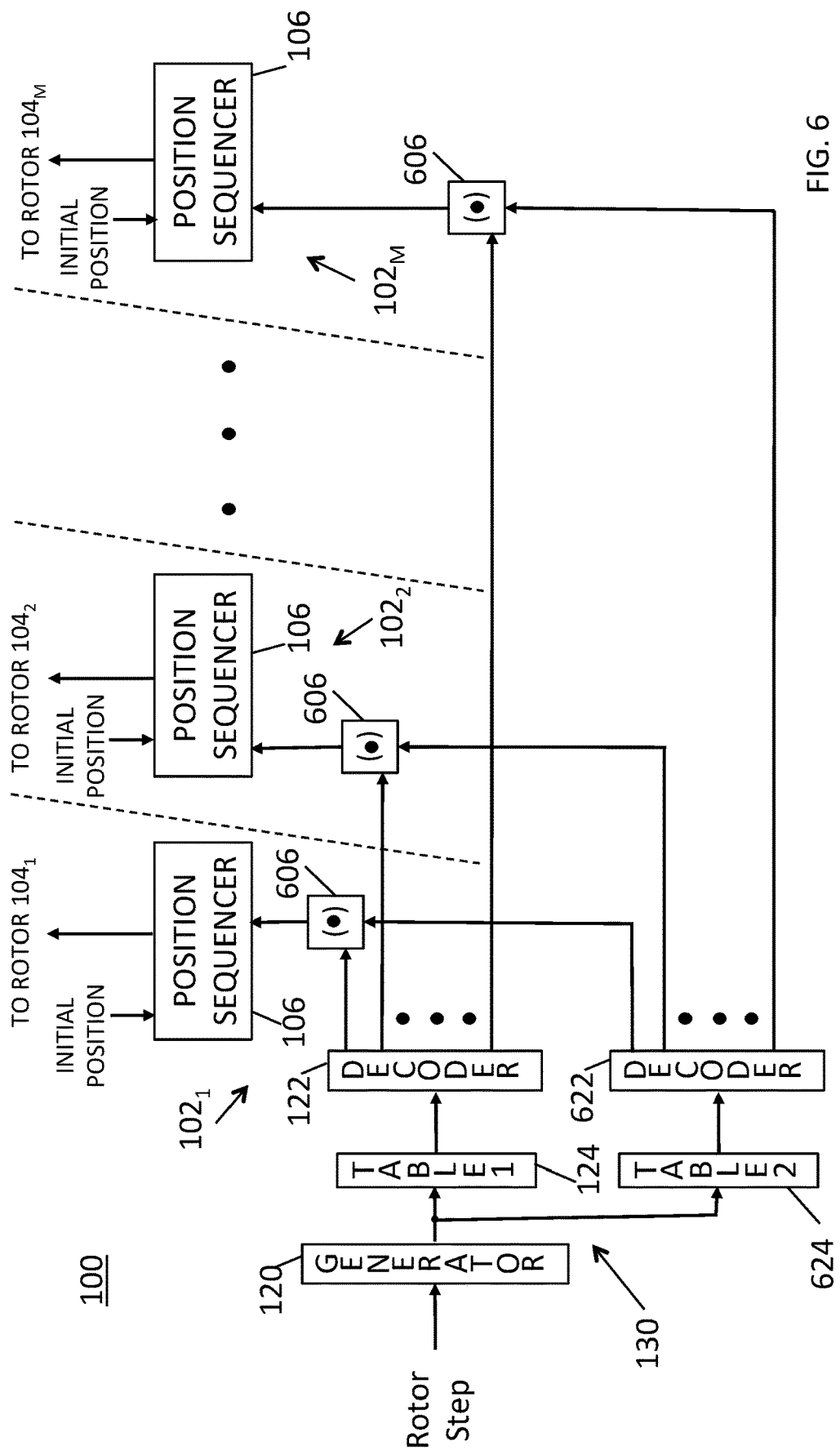
FIG. 6 is an exemplary block diagram of an alternative to the rotor movement controller portion of the cryptographic system shown in FIG. 1 in accordance with various embodiments of the invention.

In an alternative embodiment shown in FIG. 6, the rotor movement controller 130 has two or more mapping tables, 124, 624 to allow for more than one rotor to move at the same time for each letter or data value processed by the system 100. Each of the tables 124, 624 receive values from generator 120, described above, and drive respective one-of-M decoders 122, 622. To further complicate the movement of the rotors 104, individual outputs of the decoders 122, 622 are combined by logic function blocks 606 in each of the stages 102, where "(•)" represents a logic function. For example, if only one output of a decoder 122, 622 is a logic "1" at a time and the rest remain at a logic "0", then, in one embodiment, each of the logic function blocks 606 is typically an "OR" gate. It is understood that other logic gates, such as NAND, EX-OR, etc. might be used as required. Alternatively, separate sequence generators (not shown) might be provided as the input to each of the tables 124, 624. In addition, the mapping tables 124, 624 may also contain the same sequences as those stored in look-up tables discussed below.

Figure 7:
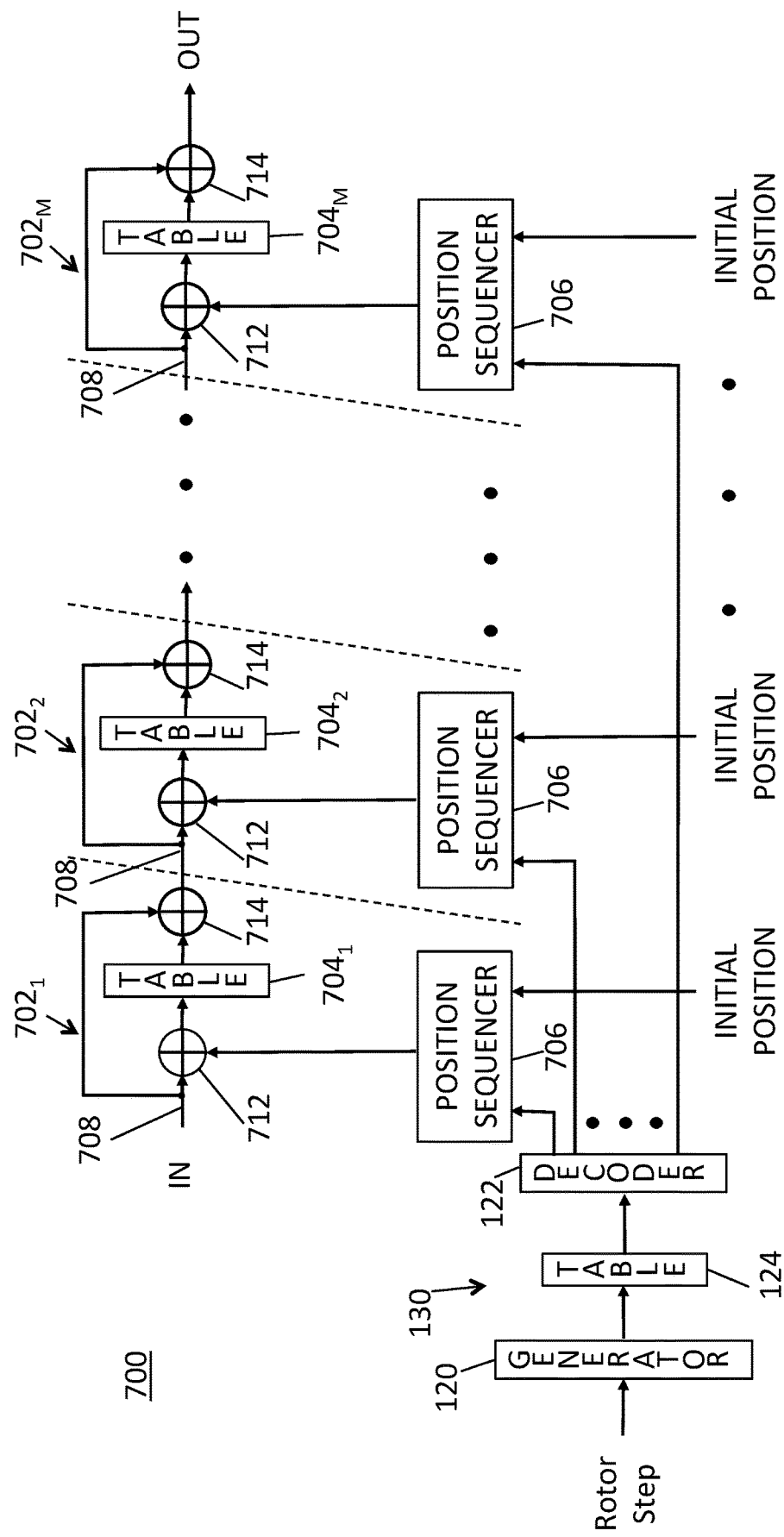
FIG. 7 is an exemplary block diagram of an electronic embodiment of a cryptographic system based on the electromechanical cryptographic system shown in FIG. 1 in accordance with various embodiments of the invention.

In FIG. 7, an all-electronic embodiment (e.g., in software executed by a processor or implemented as part of an integrated circuit) of the cryptographic system 100 in FIG. 1 is shown. In this embodiment, the cryptographic system 700 comprises a series of stages 702, rotor position sequencers 706, and a rotor movement controller 130 comprising a rotor selection generator 120, a table 124, and a decoder 122. The operation of the generator 120, table 124, and decoder 122 is substantially as described above. In each stage 702, instead of a rotor 104 and a sequencer 106 that physically moves the rotor 104 as shown in FIG. 1, there is a mathematical equivalent of a rotor 104 and a sequencer 106. To emulate a physical rotor 104, a modulo-N adder 712 receives a data value on input 708 and a value from a respective position sequencer 706, described below, to generate an index value. A look-up table 704 receives the sum from adder 712 (the index value) and produces a displacement value, as will be described in more detail below. The displacement value from the table 704 is then added, by modulo-N adder 714, to the value applied to the input 708 to produce a transformed data value at an output that is coupled to the input 708 of a subsequent stage 702 or to the output OUT of the system 700. The combination of the adders 712, 714, and table 704 function as the electrical equivalent of a physical rotor 104. The displacement values stored in each of the tables 704 numerically describe or model the physical wiring (the wiring of the input contacts 114 to the output contacts 114) of a corresponding rotor 104 shown in FIG. 1. For example, using the rotor wirings shown in FIG. 1, the following displacement values can be determined from the rotor $104_1$ in stage $102_1$ starting with contact A, following the wiring from left to right:

0, 3, 5, 3, −2, −2, −1, −6.

Because modulo N arithmetic is used (N=8 in this example) in the system 700, the above can be rewritten as:

0, 3, 5, 3, 6, 6, 7, 2;

these values are then stored in the table $704_1$ in stage $702_1$ in FIG. 7.

Similarly, for the rotors 104 in stages $102_2$ and $102_M$, the displacement values are 2, 2, 4, 6, 0, 3, 1, 6, and 3, 3, 6, 4, 1, 4, 4, 7, respectively, and are stored in the corresponding tables 704 in stages $702_2$ and $702_M$.

One significant difference between the physical rotor embodiment of FIG. 1 and the electronic version in FIG. 7 is that the input IN, the output OUT, and the inputs 708 of each stage 702 is a multi-bit value having at least $\log_2$ N bits instead of N leads or wires. Thus, only one letter at a time can be applied to the cryptographic system 700 whereas all N letters can be applied simultaneously in the cryptographic system 100. By using the binary values for the letters being processed by the system 700, the adders 712, 714, and the displacement look-up table 704 can implemented using conventional binary logic circuits and memories.

Each position sequencer 706, similar in function to the sequencers 106 described above, generates at an output thereof a series of "position" values from one to N (or zero to N−1 depending on implementation), where N is the number of "positions" an equivalent rotor can have and the number of entries in a table 704. An initial position value applied to each of the position sequencers 706 establish an initial value for the position sequencer 706 to have when starting an encryption or decryption by system 700. In one embodiment, each of the position sequencers 706 is simple up or down counter having a preset input that receives the respective initial position value. The counter is clocked in response to the decoder 122 to increment or decrement the counter and, hence, the value applied to the respective adder 712.

The result is, for each stage 702, an input value, I, applied to input 708 is transformed to an output, O, in accordance with:

$$O=I+T(P+I);\quad\quad\text{(Eq. 1)}$$

where P is the position value from corresponding position sequencer 706, T is the displacement value from the corresponding displacement look-up table 704 indexed by the index value P+I, and all additions are done modulo N.

In an alternative embodiment, the adders 712 might be subtractors. Depending on how the displacement values stored in the displacement look-up tables 704 are generated as explained below, the adders 714 might be subtractors. If subtractors are used instead of the adders 714, the above equation is modified accordingly but still performed modulo N:

$$O=I-T(P+I);\quad\quad\text{(Eq. 2)}$$

To add complexity to the cryptographic system 700, the rotors 104 are selected from set of rotors specified by a portion of the key or set by a prearranged schedule. The more the available rotors, the more difficult a decryption without having the key. Having hundreds or even thousands of physical rotors is not practical. But by using an electronic embodiment such as the cryptographic system 700, the values in the displacement look-up tables 704 can be stored in a memory, e.g. a non-volatile memory such as a FLASH memory, so that thousands of such tables can be stored and selected ones used by the system 700 as the tables 704 as specified by or derived from corresponding portions of the key. For example, by having a "basket" of $2^{10}$ (1024) stored lookup table values, then M (the number of stages 702) 10-bit fields can be added to the key to specify which of the 1024 tables to be used for the respective ones of the M displacement look-up tables 704.

As described above, signals in the cryptographic system 700 are unidirectional (left to right in this figure) so that plaintext to be encrypted is applied to input IN during encryption and ciphertext appears at the output OUT, whereas, during decryption, the ciphertext is applied to the input IN and plaintext appears at the output OUT. This means that the tables are changed depending on whether the system 700 is being used for encrypting or decrypting, unlike the rotors 104 in FIG. 1 where the rotors are not changed between encryption and decryption. Thus, two sets of tables are needed, one set for encrypting and the other for decrypting. The need to have two sets of tables can be eliminated by using a class of rotor wiring or table displacements that are self-reciprocal as described below.

With any of the encryption systems described above, it is generally desirable to step at least one of the rotors from the initial positions (usually part of the key) by clocking the generator 120 at least once before encrypting the first letter or data value applied to the system.

Rotor Design

It is desirable that each rotor 104 provides a high level of diffusion, i.e., an apparently random mapping of an input to output. The fewer patterns in the mapping, the more difficult it is to decrypt the ciphertext without the key. However, known rotor designs, such as those used in the well-known German Enigma cryptographic systems, have a series of "loops" or "cycles" that were used to help identify which one of six rotors was used as the most frequently stepped rotor (the "fast" rotor) during an encryption. The loops formed a pattern in the encryption ciphertext, thereby allowing for a quick identification of which ones of rotors were used. As such, the loops formed by the rotor are a "fingerprint" of the rotor. As used herein, a loop is the number of complete circuits the rotor has when the output terminals of the rotor are fed back to the corresponding input terminals. For example, using the rotor $104_1$ in stage $102_1$, there are three loops, one from terminal A to terminal A (abbreviated A-A, shortened to just A), and one from terminals B to E to C to H and then back to B (abbreviated B-E-C-H), and one from terminals D to G to F and back to D (abbreviated D-G-F). For the rotor $104_2$ in stage $102_2$, there are three loops (A-C-G-H-F, B-D, and E), and for the final rotor in stage $102_M$, there are two loops (A-D-H-G-C, and B-E-F).

As can be inferred from the above, it has been found to be desirable for a rotor to have only one such loop. However, generating such a rotor wiring can be very difficult, especially when the number of rotor contacts is relatively large, e.g., 26, 32, or more, since there are $26^{26}$ possible valid (referred to herein as one input terminal wired to one and only one output terminal) wiring arrangements for an N=26 rotor, not all of them resulting in a single loop.

To provide sufficient randomization or diffusion of the inputs to the outputs, i.e., reducing the regularity of the input to output mapping by the rotor or an electronic equivalent in a table, in one embodiment of the invention, the displacement values of the rotor wirings or the stored values in a displacement look-up table 704 contain all of the values between 1 and N−1 inclusive once, where N is the number of contacts on one side of a rotor or the number of entries in each of the tables 704, and one displacement, N/2, is used twice, and N is an even number. For example, for a rotor of 8 contacts (N=8), the displacements used are 1, 2, 3, 4, 4, 5, 6, and 7. For N=10, the displacements are 1, 2, 3, 4, 5, 5, 6, 7, 8, and 9. But only a small subset of these will result in wirings or displacement sequences having a single loop.

All permutations of the above displacement values may be tested to identify sequences of displacement values that result in a single loop. Different test techniques can be used to determine if a single loop exists. For a physical rotor, the determination if a single loop exists might be done as described above. In one embodiment where a displacement table is used and as will be shown in examples below, a computer is programmed to generate permutations of the displacement value sequences and to test each generated displacement value sequence to check of a single loop exists for that permutation. For example, beginning with the first entry or position in the displacement sequence being tested, the displacement value is added to (or subtracted from) its position to get a next position, then the displacement value at that position is added to (or subtracted from) its position to get the next position, etc., for N times. In this example, a single loop exists only when the final position is equal to the initial position after N steps and not before.

If a single loop exists, then the displacement sequence that resulted in the single loop is recorded but if a single loop does not occur, a next permutation is generated and that permutation tested as above. Thus, instead of testing $N^N$ possible wirings or sequences, only N! permutations are tested, albeit a very large number. Shortcuts can be used to further reduce the number of permutations to be tested, e.g., (N−1)! permutations or fewer.

For N=8 and for use in accordance with Eq. 1, above, all of the rotor displacements that satisfy the above criteria using the above search technique are the following:

TABLE 1

| | SEQUENCE | RECIPROCAL | RECIP. REORDERED |
|---|---|---|---|
| 1 | 1 2 4 4 6 3 7 5 | 5 7 2 6 3 1 4 4 | 1 4 4 5 7 2 6 3 |
| 2 | 1 4 4 5 7 2 6 3 | 3 7 5 1 2 4 4 6 | 1 2 4 4 6 3 7 5 |
| 3 | 1 5 2 4 4 6 7 3 | 4 7 5 2 6 1 3 4 | 1 3 4 4 7 5 2 6 |
| 4 | 1 3 4 4 7 5 2 6 | 6 7 3 1 5 2 4 4 | 1 5 2 4 4 6 7 3 |
| 5 | 1 4 6 3 7 2 4 5 | 2 7 4 1 3 4 5 6 | 1 3 4 5 6 2 7 4 |
| 6 | 1 3 4 5 6 2 7 4 | 3 7 2 4 5 1 4 6 | 1 4 6 3 7 2 4 5 |
| 7 | 1 5 2 4 7 3 4 6 | 5 7 4 1 6 2 3 4 | 1 6 2 3 4 5 7 4 |
| 8 | 1 6 2 3 4 5 7 4 | 4 7 3 4 6 1 5 2 | 1 5 2 4 7 3 4 6 |
| 9 | 1 4 6 4 2 7 5 3 | 2 7 5 3 1 4 6 4 | 1 4 6 4 2 7 5 3 |
| 10 | 1 6 4 2 4 7 5 3 | 4 7 5 3 1 6 4 2 | 1 6 4 2 4 7 5 3 |
| 11 | 1 2 5 3 4 7 4 6 | 4 7 4 6 1 2 5 3 | 1 2 5 3 4 7 4 6 |
| 12 | 1 4 5 3 6 7 2 4 | 6 7 2 4 1 4 5 3 | 1 4 5 3 6 7 2 4 |

For convenience, all the listed displacements begin with a one ("1"); it is the order of the displacement sequences that is important, not which value is first since, like a physical rotor, the displacement sequences are arranged in a circular arrangement because of the modulo N arithmetic used to calculate which entry in the displacement table is used (see Eq. 1 and Eq. 2 and the descriptions thereof, above). Also, the wirings or displacement sequences shown in the second column are the reciprocal of the displacements in the first column. In other words, by using the displacement sequences in the first column for encryption, the corresponding displacement sequences shown in the second column are used for decryption using the same initial position values. For example, for the first group of sequences (rows 1-4), the entry in the first column of the first row of displacement sequences shown in Table 1 is for one rotor wiring or values in a displacement table resulting in a single loop. The second column of the first row is the reciprocal of the wiring or displacement sequences in the first column of the first row and thus also forms a single loop. Entries in the third column are the sequences in the second column re-sequenced to begin with "1" as done in the first column. The entry in the first column second row is the same as the entry in the third column of the row above. Thus, the sequences shown on the first two rows are essentially the same.

The sequences on the third and fourth rows of Table 1 are also essentially the same. However, the sequences in rows 3 and 4 are related to or derived from the sequences in rows 1 and 2. They represent a mirror image of a physical rotor wired in accordance with the first two rows but "flipped around" to generate the third and fourth sequences. For example, a physical rotor with wiring based on the first sequence is turned around so the contacts that were on the left are now on the right, resulting in a rotor with wiring in accordance with the sequence in the third row. Thus, the sequences in the third and fourth rows might be considered distinct from the sequences on the first and second rows although related thereto.

The above description also applies to the second group of sequences (rows 5-10). This is a separate set of sequences distinct from the first group of sequences.

While the sequences in rows 9 and 10 are related in the same way that the sequences in rows 1 and 2 relate to those in rows 3 and 4 as discussed above, the sequences in rows 9 and 10 are unique in that they are self-reciprocal, i.e., the same sequence can be used for both encrypting and decrypting. Similarly, the sequences in rows 11 and 12 are related as sequences in rows 9 and 10 are related and are self-reciprocal as well. To utilize the self-reciprocal nature of these sequences, an offset of N/2 is selectively added (mod N) to the index calculation of Eq. 1 or 2 to determine the displacement values from T, e.g.:

$$O = I + T(P + I + N/2). \quad \text{(Eq. 3)}$$

Thus during encryption, for example, Eq. 1 is used to create the ciphertext and Eq. 3 is used to reconstruct the plaintext from the ciphertext, both performed without changing the displacement sequences stored in T (here, tables 704). Using the self-reciprocal sequences allows for an all-electronic Enigma-like encryption/decryption system (no need to change rotors whether encrypting or decrypting) but with the advantage of an input letter being able to represent itself as an output letter, i.e., any one of the possible input letters can appear as any output letter. Alternatively, in the embodiments of FIGS. 1 and 7, during decryption the initial position values derived from the key are offset by N/2 (mod N) from that used during encryption or vice versa.

Figure 8:
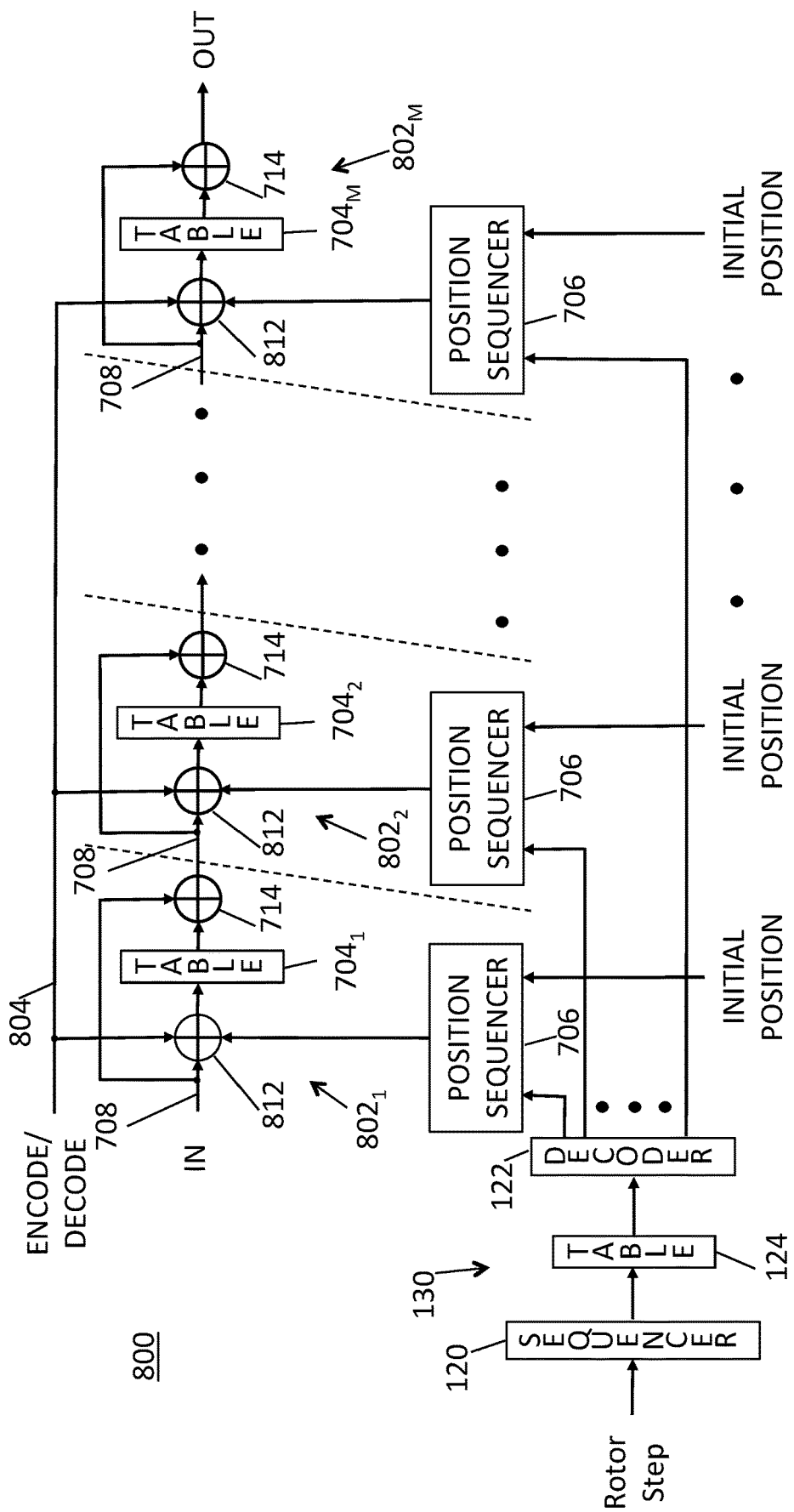
FIG. 8 is an exemplary block diagram of an electronic cryptographic system utilizing self-reciprocal rotor wiring information stored in tables in accordance with various embodiments of the invention.

An embodiment of an encryption system 800 configured to utilize the above-described self-reciprocal property is shown in FIG. 8. Here, the adders 712 of FIG. 7 are replaced with triple input modulo N adders 812 in each stage 802. An encode/decode configuration input 804, coupled to each of the triple-input adders 812, selectively applies the amount N/2 to the adders during decrypting and zero to the adders during encrypting, or vice versa. Otherwise the system 800 operates as described above in connection with system 700. It is understood that one or more of the triple-input adders 812 might be implemented using two conventional modulo N adders in tandem to synthesize a three input adder as is known in the art or by using logic blocks, such an exclusive OR, to avoid using a second adder to form a triple-input adder 812.

As mentioned above, the adders 714 (FIG. 7) can be subtractors. When using subtractors, the displacement values in Table 1 will not work because the displacement values are subtracted from each other modulo N for determining if a single loop results. Instead, the following displacement values can be used when encrypting/decrypting in accordance with Eq. 2 for N=8:

TABLE 2

| | SEQUENCE | RECIPROCAL | RECIP. REORDERED |
|---|---|---|---|
| 1 | 1 3 7 6 4 4 2 5 | 4 4 3 1 6 2 5 7 | 1 6 2 5 7 4 4 3 |
| 2 | 1 6 2 5 7 4 4 3 | 6 4 4 2 5 1 3 7 | 1 3 7 6 4 4 2 5 |
| 3 | 1 5 7 3 6 4 4 2 | 5 4 4 1 3 6 2 7 | 1 3 6 2 7 5 4 4 |
| 4 | 1 3 6 2 7 5 4 4 | 3 6 4 4 2 1 5 7 | 1 5 7 3 6 4 4 2 |
| 5 | 1 6 4 3 7 4 2 5 | 5 4 3 2 6 1 4 7 | 1 4 7 5 4 3 2 6 |
| 6 | 1 4 7 5 4 3 2 6 | 4 2 5 1 6 4 3 7 | 1 6 4 3 7 4 2 5 |
| 7 | 1 5 4 2 7 3 6 4 | 2 6 5 4 3 1 4 7 | 1 4 7 2 6 5 4 3 |
| 8 | 1 4 7 2 6 5 4 3 | 3 6 4 1 5 4 2 7 | 1 5 4 2 7 3 6 4 |
| 9 | 1 3 5 7 4 2 4 6 | 4 2 4 6 1 3 5 7 | 1 3 5 7 4 2 4 6 |
| 10 | 1 3 5 7 2 4 6 4 | 2 4 6 4 1 3 5 7 | 1 3 5 7 2 4 6 4 |
| 11 | 1 4 2 7 6 3 5 4 | 4 6 3 5 4 1 4 2 7 | 1 4 2 7 6 3 5 4 |
| 12 | 1 6 4 7 4 3 5 2 | 4 3 5 2 1 6 4 7 | 1 6 4 7 4 3 5 2 |

The first four rows of displacement sequences in Table 2 correspond to the first four rows in Table 1, the second four rows of displacement sequences in Table 2 correspond to the second four rows in Table 1, etc. The displacement sequences in Table 2 may be derived from those in Table 1 by subtracting each entry in Table 1 from N (mod N) and shifting the sequences to begin with a "1".

For N=10 and adders 714, several exemplary rotor displacements that satisfy the above are:

TABLE 3

| | SEQUENCE | RECIPROCAL | RECIP. REORDERED |
|---|---|---|---|
| 1 | 1 6 8 3 4 7 9 2 5 5 | 2 9 3 5 5 1 7 4 6 8 | 1 7 4 6 8 2 9 3 5 5 |
| 2 | 1 7 4 6 8 2 9 3 5 5 | 7 9 2 5 5 1 6 8 3 4 | 1 6 8 3 4 7 9 2 5 5 |
| 3 | 1 8 2 4 6 3 9 5 5 7 | 4 9 5 5 8 1 3 6 7 2 | 1 3 6 7 2 4 9 5 5 8 |
| 4 | 1 3 6 7 2 4 9 5 5 8 | 3 9 5 5 7 1 8 2 4 6 | 1 8 2 4 6 3 9 5 5 7 |
| 5 | 1 5 2 4 5 8 6 3 7 9 7 | 9 4 2 8 3 5 6 1 5 1 | 5 7 9 4 2 8 3 5 6 |
| 6 | 1 5 7 9 4 2 8 3 5 6 7 | 9 1 5 2 4 5 8 6 3 | 1 5 2 4 5 8 6 3 7 9 |
| 7 | 1 3 5 9 4 5 7 2 8 6 5 | 9 1 3 7 4 2 5 6 8 | 1 3 7 4 2 5 6 8 5 9 |
| 8 | 1 3 7 4 2 5 6 8 5 9 5 | 9 4 5 7 2 8 6 1 3 | 1 3 5 9 4 5 7 2 8 6 |
| 9 | 1 3 6 4 5 8 9 5 2 7 8 | 9 5 2 7 1 3 6 4 5 | 1 3 6 4 5 8 9 5 2 7 |
| 10 | 1 2 5 6 4 7 9 3 8 5 7 | 9 3 8 5 1 2 5 6 4 | 1 2 5 6 4 7 9 3 8 5 |

TABLE 3-continued

| | SEQUENCE | | | | | | | | | | | | RECIPROCAL | | | | | | RECIP. REORDERED | | | | | | | | | | | |
|---|---|---|---|---|---|---|---|---|---|---|---|---|---|---|---|---|---|---|---|---|---|---|---|---|---|---|---|---|---|---|
| 11 | 1 | 2 | 5 | 5 | 6 | 4 | 9 | 7 | 8 | 3 | 4 | 9 | 7 | 8 | 3 | 1 | 2 | 5 | 5 | 6 | 1 | 2 | 5 | 5 | 6 | 4 | 9 | 7 | 8 | 3 |
| 12 | 1 | 6 | 4 | 5 | 5 | 8 | 9 | 7 | 2 | 3 | 8 | 9 | 7 | 2 | 3 | 1 | 6 | 4 | 5 | 5 | 1 | 6 | 4 | 5 | 5 | 8 | 9 | 7 | 2 | 3 |

Except for the length of the sequences, the sequences in rows 1-8 of Table 3 have similar properties as the sequences in rows 1-8 in Table 1, and the sequences in rows 9-12 of Table 3 have similar properties as the sequences in rows 9-12 in Table 1.

Using an exhaustive search of all permutations using the above displacements for N=4 to N=18, the following number of valid permutations was found:

TABLE 4

| N | Possible Permutations | Single loop (A) | Self-inverting (B) |
|---|---|---|---|
| 4 | 3 | 1 | 1 |
| 6 | 60 | 2 | 2 |
| 8 | $2.5 \; 10^3$ | 12 | 4 |
| 10 | $1.8 \; 10^5$ | 144 | 24 |
| 12 | $2.0 \; 10^7$ | $1.9 \; 10^3$ | 88 |
| 14 | $3.1 \; 10^9$ | $4.5 \; 10^4$ | 288 |
| 16 | $6.5 \; 10^{11}$ | $1.4 \; 10^6$ | $1.9 \; 10^3$ |
| 18 | $1.8 \; 10^{14}$ | $5.2 \; 10^7$ | $1.1 \; 10^4$ |
| 26 | $7.8 \; 10^{24}$ | $2 \; 10^{16}$ | $1 \; 10^8$ |
| 32 | $4.1 \; 10^{33}$ | $4 \; 10^{24}$ | $8 \; 10^{11}$ |
| 40 | $1.0 \; 10^{46}$ | $2 \; 10^{38}$ | $1 \; 10^{18}$ |

Figure 9:
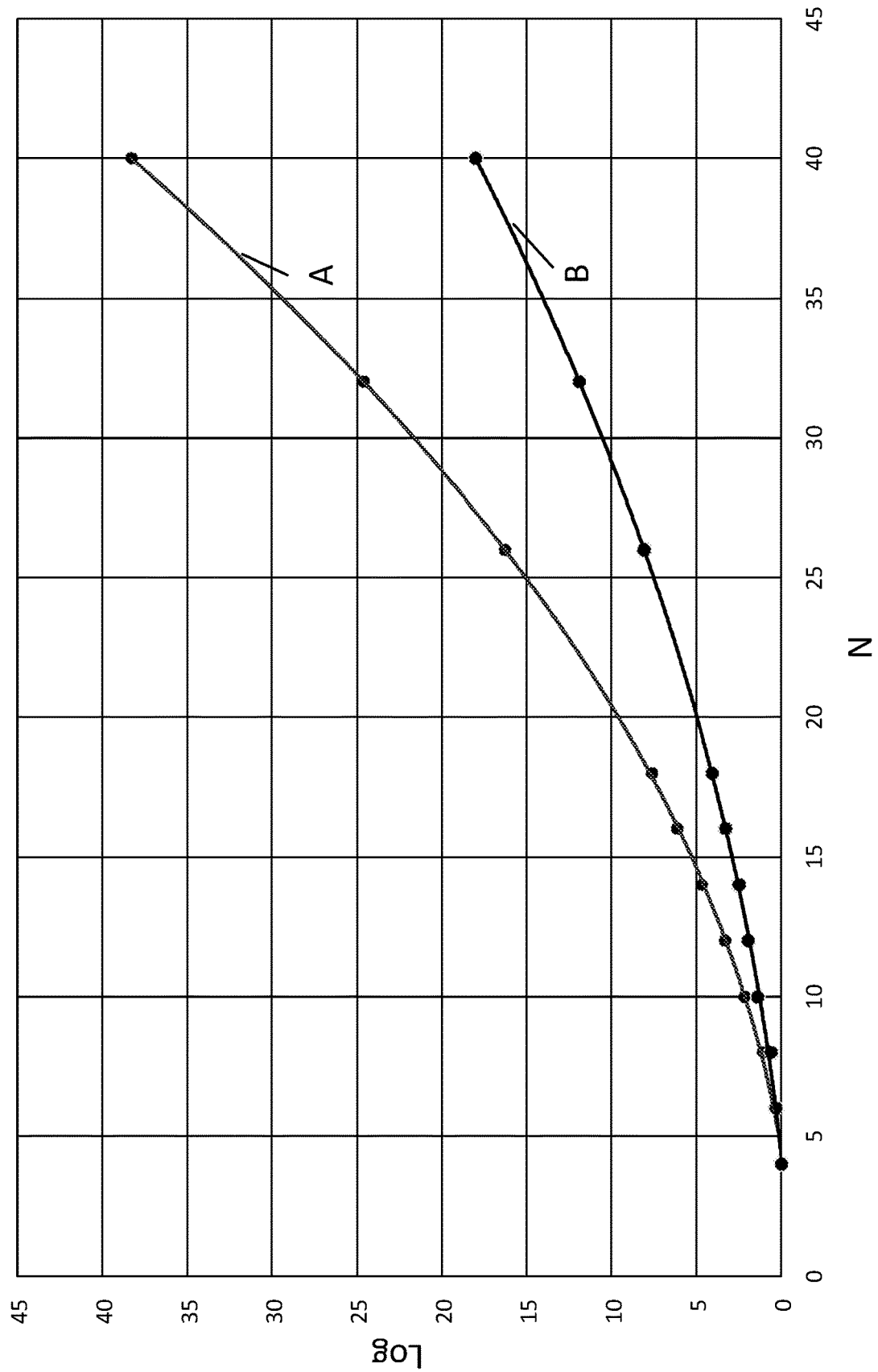
FIG. 9 is a graph illustrating the number of unique rotor wirings for various numbers of contacts (either inputs or outputs) for a physical rotor or table entries in an all-electronic system in accordance with various embodiments of the invention.

Curve fitting the logarithm (base-ten) of the data in the right columns for $4 \leq N \leq 18$ allows extrapolation of the data for N=26, 32, and 40. As can be seen from the extrapolated data in FIG. 9, where the vertical axis is the base-ten logarithm of the data shown in the right two columns (A and B, respectively) in Table 4, the number of such valid single loop and self-inverting permutations is quite large even for N=26, allowing for thousands of possible rotor wirings/displacement value sequences to be used. However, some of the displacement value sequences are similar enough to each other that they might be considered substantially the same. Checking number of coincidences for one set of wirings or displacement value sequences to another set gives an indication of how similar different wirings or displacement sequences are from each other. Similar to that described above in connection with the mapping tables 124, a mutual coincidence index is calculated by counting the number of coincidences for each set of displacements as they are shifted with respect to each other. For example, using the sequences above for N=10, the sequences in rows 1 and 5 has a peak mutual coincidence index of three, and the sequences in rows 9 and 11 have a peak mutual coincidence index of two. It is generally desirable that the sequences used in the rotors 104 or used in tables 704 have low peak mutual coincidence indexes, preferably no more than N/2, e.g., five or less for N=10. Thus, it is desirable for the "basket" of stored lookup table values described above to contain only tables with low peak mutual coincidence indexes with respect to all of the other stored tables.

In another embodiment, the lookup table values or sequences described above may be used in substitution or S-boxes used in Feistel-type or similar encryption systems.

It should be understood that the steps of the exemplary method set forth herein are not necessarily required to be performed in the order described, and the order of the steps of such method should be understood to be merely exemplary. Likewise, additional steps may be included in such method, and certain steps may be omitted or combined, in such method consistent with various embodiments of the invention.

Although the invention has been described using relative terms such as "front", "back", "over", "left", "right" and the like in the description and in the claims, such terms are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Unless stated otherwise, terms such as "first" and "second" are used in the claims to arbitrarily distinguish between the elements such terms describe. Thus, these terms are not necessarily intended to indicate temporal or other prioritization of such elements. Further, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

The invention claimed is:

1. A method of operating a multistage cryptographic system comprising:
   a plurality of serially-coupled cryptographic stages and at least one memory device, each stage having a corresponding look-up table with N entries stored in the at least one memory where N is an even integer, a data input, and a data output, wherein each stage performs the steps of:
   a) receiving, at the data input of the stage, a data value having one of N values;
   b) generating a position value;
   c) combining, with one of an adder and a subtractor, the received data value with the position value to generate an index value having one of N values;
   d) reading a displacement value from the look-up table of the stage indexed by the index value, the displacement value having one of N values; and
   e) combining, with one of an adder and a subtractor, the received data value with the displacement value to generate an output data value applied to the data output of the stage, the output data value having one of N values;
   wherein one of the N entries contains integer value N/2 and remaining N−1 of the N entries only contains all integer values between 1 and N−1 inclusive; and
   wherein each of the N entries stores only one of the integer values.

2. The method of claim 1 wherein the values in each of the look-up tables are in a sequence that forms a single loop that is self-reciprocal.

3. The method of claim 1 wherein the values in the look-up tables are selected from a group of look-up table values in accordance with a portion of a key value, and the position value for each stage is initially set in accordance with respective portions of the key value.

4. The method of claim 1 wherein step b) the position value for each stage is selectively incremented for each data value received in step a) and in accordance with a corresponding control value.

5. The method of claim/wherein each of the look-up tables of the group of look-up tables has a peak mutual coincidence index of N/2 or less with respect to all of the other look-up tables.

6. A method of operating a multistage cryptographic system comprising a controller, a plurality of cryptographic stages coupled serially between a data input and a data output of the system, and at least one memory, wherein each stage has a corresponding look-up table with N entries stored in the at least one memory, a data input, a data output, and a control value input, each stage configured to:
   a) receive a data value at the data input of that stage and generates at the data output of that stage an output data value, the received data value and the output data value each having one of N values, where N is an even integer;
   b) receive at the control value input of the stage a control value corresponding to that stage;
   c) selectively changing, using a sequencer, a position value in response to the corresponding control value, the position value having one of N values;
   d) combine, using one of an adder and a subtractor, the received data value with the position value to generate an index value having one of N values;
   e) read a displacement value from the look-up table of the stage and indexed by the index value, the displacement value having one of N values; and
   f) combine, using one of an adder and a subtractor, the received data value with the displacement value to generate the output data value;
   wherein the controller generates the control values in response to a selection value, the selection value determining which of the control values are asserted, by:
   i) increasing the selection value with each data value received at the system input until the selection value equals or exceeds a threshold value; then
   ii) decreasing the selection value with each data value received at the system input until the selection value equals a minimum value; then
   iii) increasing the threshold value; and then
   iv) repeating steps i), ii), and iii) until the threshold value equals or exceeds a maximum value; and then
   v) decreasing the threshold value; and
   vi) repeating steps i) through v).

7. The method of claim 6 wherein in step v) comprises the steps of:
   A) decreasing the threshold value and setting the selection value to the minimum value;
   B) increasing the selection value with each data value received at the input of the system until the selection value equals or exceeds a threshold value; then
   C) decreasing the selection value with each data value received at the input of the system until the selection value equals a minimum value; and then
   D) repeating steps A), B), and C) until the threshold value equals the minimum value.

8. The method of claim 6 wherein in step ii) the selection value is decreased by setting the selection value to the minimum value.

9. The method of claim 6 wherein step c) further comprises:
   incrementing, for each received data value received at the input of that stage, the position value in accordance with the corresponding control value.

10. The method of claim 6 wherein:
    there are M cryptographic stages with corresponding control values, position values, and look-up tables, each of the M look-up tables selected from a group of look-up tables in accordance with a portion of a key value,
    only one control value is asserted by the controller for each generated selection value;
    each of the M position values are initially set in accordance with another portion of the key value, and
    M is an integer greater than one.

11. The method of claim 10 wherein, the selection value is modified by a mapping table to selectively change which of the M control values is asserted for each generated value.

12. The method of claim 11 wherein the mapping table is selected from a group of mapping tables based on a portion of a key value.

13. The method of claim 6 wherein in step v) the threshold value is decreased by setting the threshold value to the minimum value.

14. The method of claim 6, wherein one of the N entries contains integer value N/2 and remaining N−1 of the N entries only contains all integer values between 1 and N−1 inclusive, and wherein each of the N entries stores only one of the integer values.

15. The method of claim 6 wherein in steps d) and f) the combining is done modulo-N.

16. The method of claim 1 wherein in steps c) and e) the combining is done modulo-N.

17. The method of claim 2 wherein in step c) an encode/decode value is also combined with the received data value and the position value to generate the index value;

wherein the combining is done modulo N and the encode/decode value has a value of zero or N/2.

* * * * *